United States Patent Office 3,299,732
Patented Jan. 24, 1967

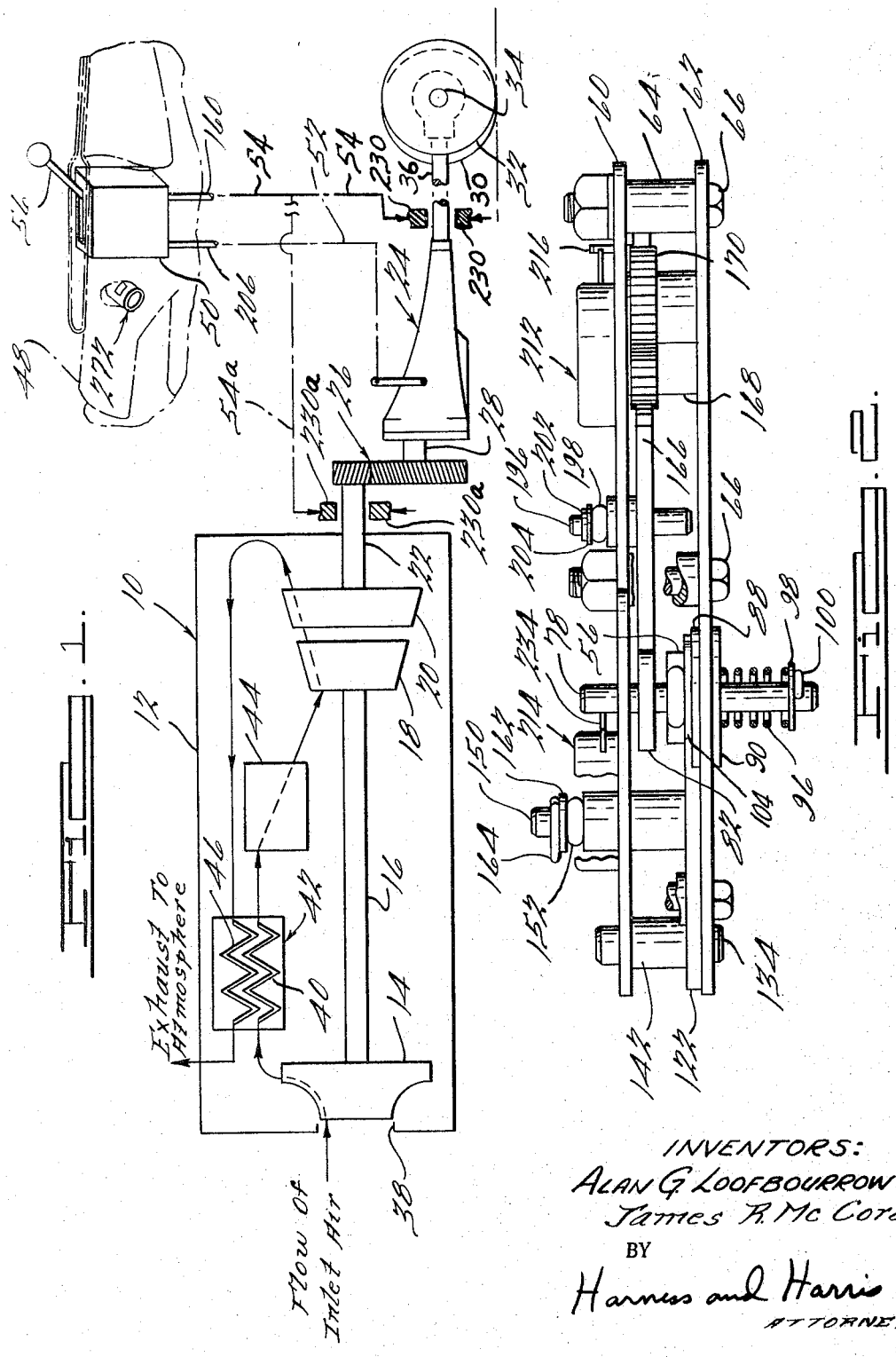

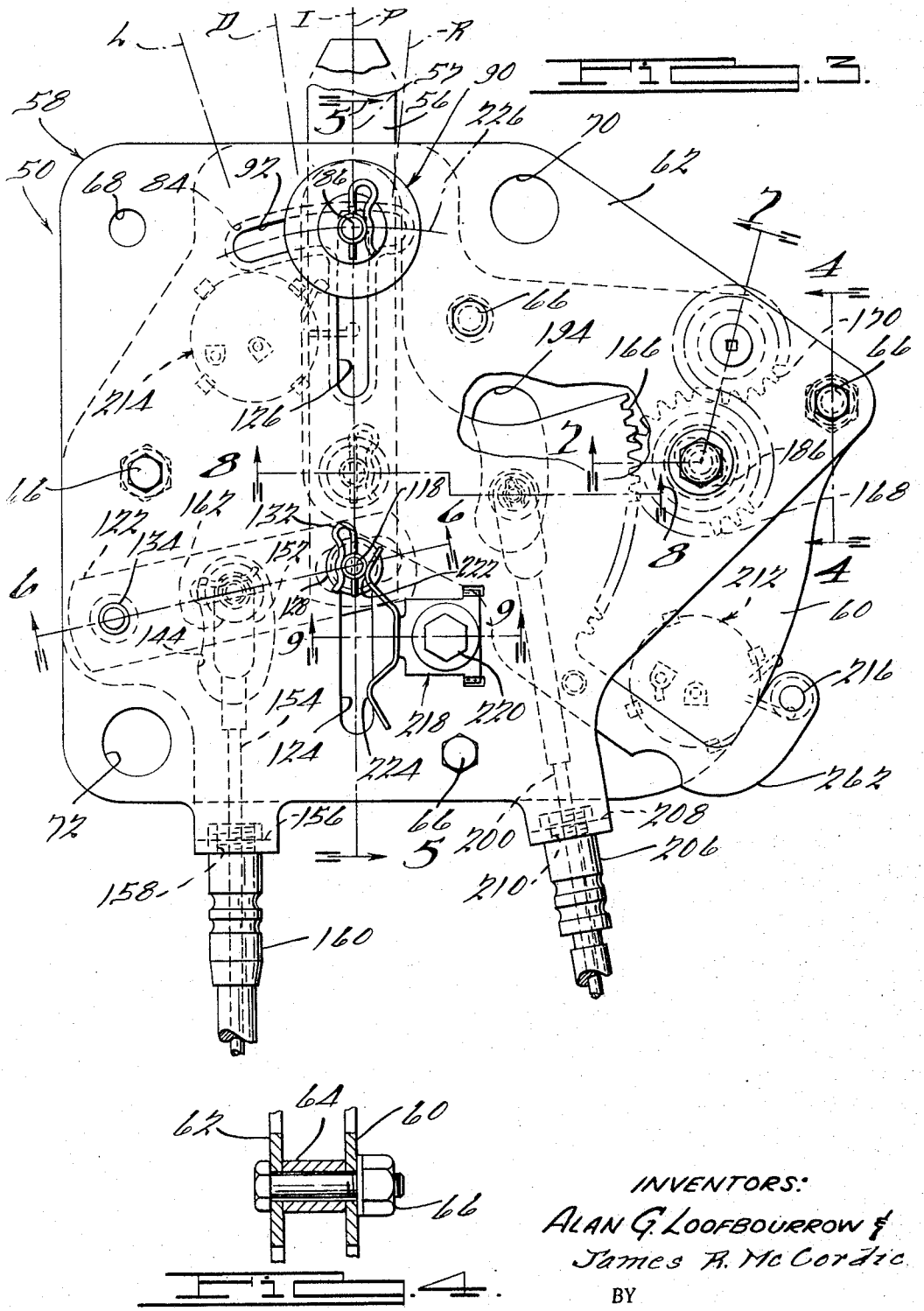

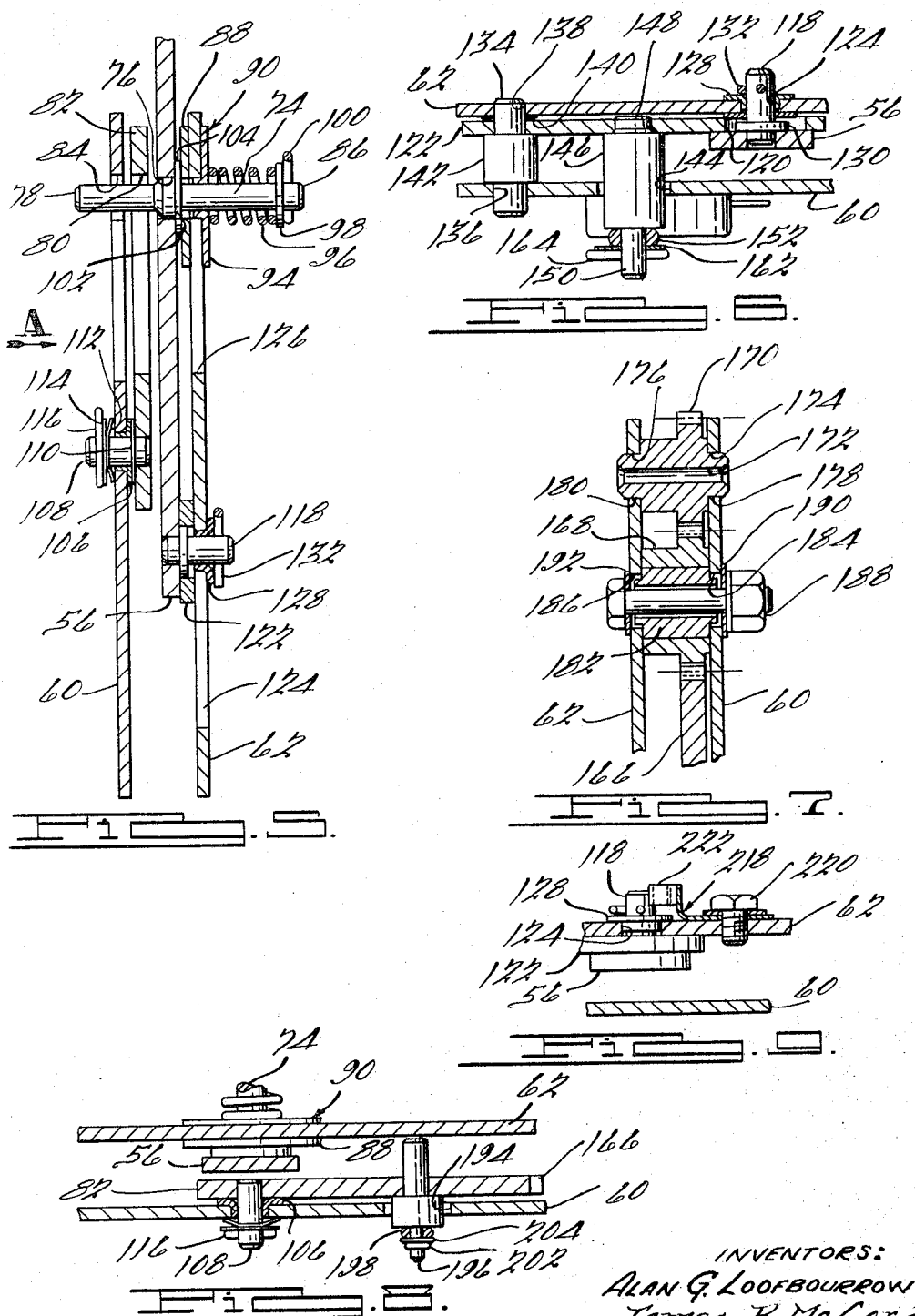

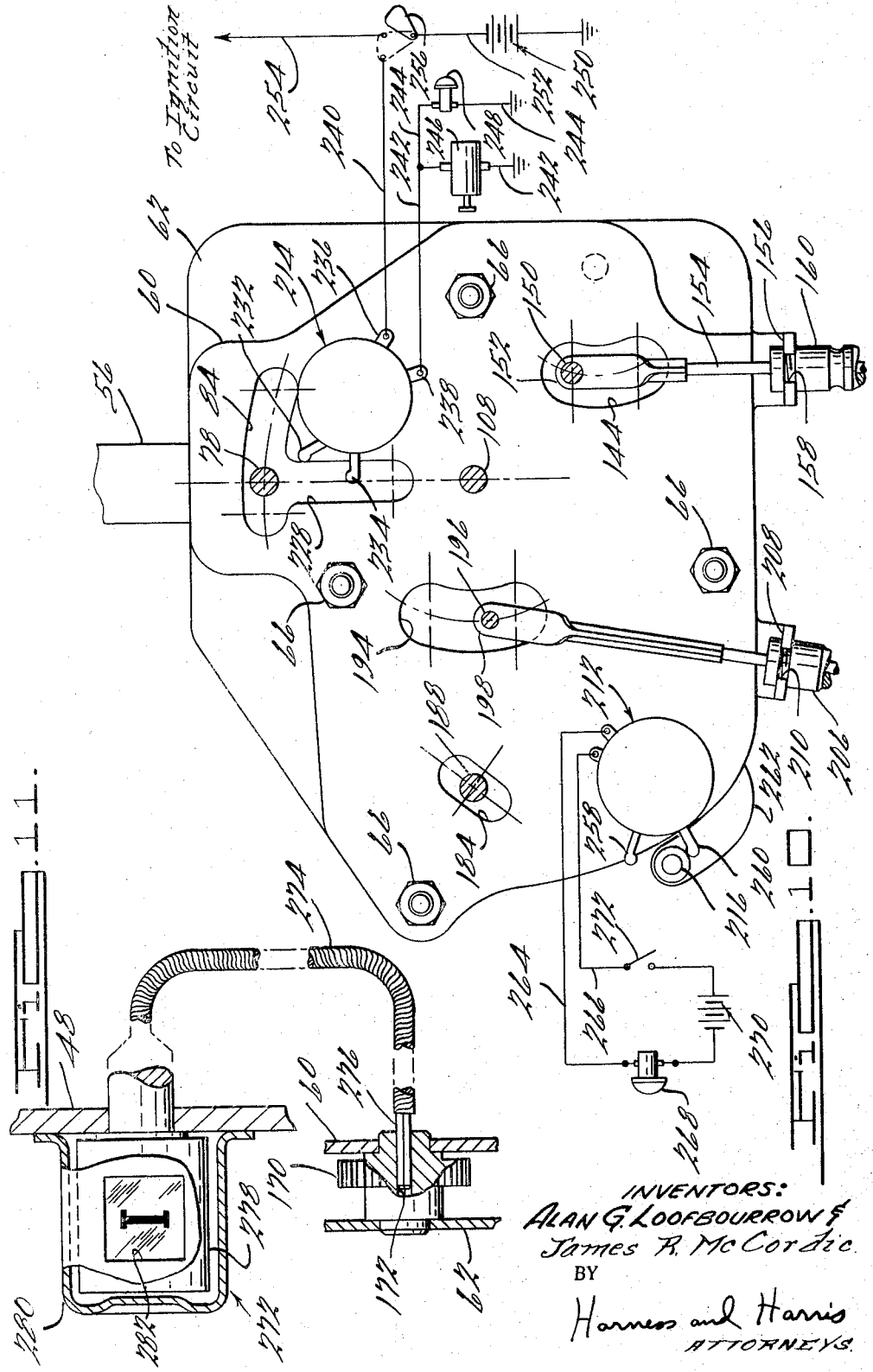

3,299,732
CONTROL LINKAGE ARRANGEMENT FOR
TURBINE TRANSMISSION
Alan G. Loofbourrow, Bloomfield Hills, and James R. McCordic, Royal Oak, Mich., assignors to Chrysler Corporation, Highland Park, Mich., a corporation of Delaware
Filed July 25, 1963, Ser. No. 297,651
5 Claims. (Cl. 74—472)

This invention relates generally to transmissions and more particularly to means for actuating the gearshift control, as commonly associated with automatic transmissions, in order to select any one of a variety of transmission operating ranges or conditions.

In some land-based vehicles employing a gas turbine engine as the prime mover, automatic type of transmissions are used to transmit motive power from the output shaft of the gas turbine engine to the ground-contacting driving wheels of the vehicle.

Automatic transmissions thusly employed in combination with split-turbine or free-shaft type of gas turbine engines may present problems during certain periods of engine operation.

For example, in the usual free-shaft turbine engine, two turbine wheels or rotors are employed for generally different purposes. That is, the first stage rotor (compressor turbine) drives the compressor which supplies air to the combustion chamber where a suitable fuel is added and burned in order to produce heated motive driving gases. Downstream of the compressor turbine, and usually in axial alignment therewith, is a second stage rotor (power turbine) which, driven by the motive gases passing through the compressor turbine, drives an output shaft operatively connected to the input shaft of a transmission assembly.

In view of the above, it can be appreciated that the speed of rotation of the power turbine and its associated output shaft is dependent not only on the supply of motive gases directed thereagainst, but also on the load placed on the power turbine and output shaft. That is, under maximum load conditions the speed of the gas generator section (comprised of the compressor, burner and compressor turbine) may reach designed maximum speeds while the power turbine may be experiencing speeds far below that considered critical from a design standpoint. However, it becomes apparent that a runaway power turbine condition could possibly be experienced even at low or moderate gas generator speeds if there was no or very little load placed on the power turbine. That is, if there were little or no forces resisting the rotation of the power turbine the flow of motive gases therethrough could, during certain situations, cause the power turbine to rotate at speeds greater than that considered safe. One such situation could be engine cranking and early stages of engine operation immediately following cranking wherein the turbine engine has started and become self-sustaining.

During such periods of engine cranking and starting, there is relatively little or no load placed on the power turbine by the automatic transmission. Consequently, a relatively low motive gas flow developed during such periods could cause excessively high rotational speeds of the power turbine. Depending on various circumstances, such initial power turbine speeds could become critical by exceeding speeds considered safe from a design standpoint. Further, even if the initial power turbine speeds did not become critical, damage could be caused to the various bearings if provision was not made to assure proper lubrication before any significant turbine speeds are experienced.

Accordingly, it is a general object of this invention to provide means for at times creating and applying a restraining force against the power turbine of a gas turbine engine employed as a vehicle prime mover.

Another object of this invention is to provide a novel and improved means for actuating the gearshift control as commonly associated with an automatic type of vehicle transmission.

A further object of this invention is to provide novel and improved means for at times creating and applying a restraining force against the power turbine of a gas turbine engine and for actuating the gearshift control commonly associated with an automatic type of vehicle transmission.

Other more specific objects and advantages of the invention will become apparent from the following description and accompanying drawings wherein:

FIGURE 1 diagrammatically and schematically illustrates a gas turbine engine operatively connected to a vehicle transmission each of which is operatively connected to actuating means constructed in accordance with the teachings of this invention;

FIGURE 2 is a top plan view of an actuator assembly constructed in accordance with this invention;

FIGURE 3 is a side view of the actuator assembly shown in FIGURE 2;

FIGURE 4 through 9 are cross-sectional views, some fragmentary, taken on the planes of lines 4—4 through 9—9, respectively, of FIGURE 3 and looking in the direction of the arrows;

FIGURE 10 is a side view of the actuator assembly, with portions thereof sectioned, taken generally in the direction of arrow A of FIGURE 5; and FIGURE 11 is a fragmentary view partly sectioned illustrating in greater detail some of the elements comprising the invention.

Certain elements are omitted from one or more figures for purposes of clarity.

Referring now in greater detail to the drawings, FIGURE 1 schematically illustrates a gas turbine engine 10 as being comprised of a suitable housing 12 containing therein a radial compressor 14 operatively connected as by a shaft 16 to a first stage rotor or compressor turbine 18. A power turbine 20, situated generally coaxially with said compressor turbine and mounted on an engine output shaft 22, is operatively connected to an automatic transmission 24 by means of a suitable gear train 26 and a transmission input shaft 28. Vehicular driving wheels 30 and 32, suitably mounted on an axle 34, are operatively connected to the transmission output or propellor shaft 36.

As compressor 14 is rotated by the compressor turbine 18, air is drawn through the intake 38 and directed through the exothermic portion 40 of a heat exchanger 42 from where it passes into a burner or combustion chamber 44 into which fuel is supplied and burned. The motive gases flowing out of the burner 44 pass through both the compressor turbine 18 and power turbine 20, impinging upon the respective blades thereof, causing power to be transmitted thereto. The hot gases, after passing through power turbine 20, are directed to the endothermic portion 46 of heat exchanger 42 from where they are exhausted to the ambient atmosphere.

A console 148 formed generally on the floor of the vehicle between separate seats provided for the vehicle operator and the front seat passenger, houses actuating means 50, constructed in accordance with the teachings of this invention, operatively connected to the transmission 24 and the turbine engine 10 as by suitable transmission means schematically illustrated at 52 and 54, respectively.

Referring to FIGURES 2 through 5, the actuating means 50 is illustrated as being comprised of a manually positionable selector lever 56 mounted within a support structure 58 for both pivotal and linear movement therein.

Support structure 58 is comprised of generally vertically extending side plates 60 and 62 secured to each other in spaced relationship by means of tubular spacers 64 and cooperating nuts and screws 66 (see FIGURE 4). Side plate 62 is also provided with apertures 68, 70 and 72 adapted to receive suitable means for rigidly mounting the support structure 58 to an appropriate mounting portion of the vehicle.

A guide pin 74, secured within an aperture 76 formed in selector lever 56, has one of its ends 78 projecting through an elongated vertically directed slot 80, formed in a gearshift control actuator arm 82, and an arcuate slot 84 formed in side plate 60. The other end 86 of pin 74 is closely received through an annular spacer 88 and a bushing 90 which, in turn is closely received within an arcuate slot 92 formed in side plate 62. Bushing 90 is preferably provided with a relatively large radially extending flange portion 94 which overlays a substantial portion of the slot 92 and also serves as an abutment for a coiled compression spring 96 located generally about pin 74 and between flange 94 and a restraining washer 98. A suitable clip 100 or other retainer means may be provided so as to prevent axial displacement of washer 98. A shoulder 102, formed about pin 74, and a spacer 104 cooperate in maintaining selector lever 56 a predetermined minimum distance away from side plate 62.

A bushing 106, received within an aperture formed in side plate 60, slidably receives a pivot pin 108 therethrough upon which the transmission actuator arm 82 is pivotally mounted. A shoulder 110 formed about pin 108 cooperates with the flange portion of bushing 106 in maintaining arm 82 a minimal distance away from side plate 60. An annular spring member 112, thrust washer 114 and clip 116, provided at one end of pin 108, serve to axially urge pin 108 and shoulder 110 in a direction maintaining bushing 106 against side plate 60.

A second guide pin 118 having one end secured to selector lever 56 projects through an elongated slot 120, formed in sprag actuating lever 122, and an elongated vertically extending slot 124 formed in side plate 62. Slot 124 is substantially aligned with an elongated slot 126 also formed in side plate 62 and vertically depending from the arcuate slot 92. A bushing 128, located generally about guide pin 118, is partly received within slot 124 so as to guide pin 118 within said slot. An enlarged radially extending shoulder portion 130, formed on pin 118 and slidably received within slot 120, serves to limit pin 118 to only relative longitudinal movement within slot 120. Suitable retaining means such as a clip 132 may be provided at the projecting end of pin 118.

A hub member 134, secured at its opposite ends within apertures 136 and 138 formed in side plates 60 and 62, respectively, provides a pivot about which lever 122 rotates. An annular spring 140 provided between side plate 62 and lever 122 urges said lever against a shoulder 142 of hub 134.

An enlarged arcuate opening 144 formed in side plate 60 enables the free extension therethrough of one end of an actuating pin 146 which is secured at its other end 148 within an aperture formed in lever 122. Pin 146, by means of an extension 150 of reduced diameter, is pivotally connected to an end 152 of a sprag actuating cable 154. A laterally projecting tab 156 provided with an opening 158 serves to retain and support the cable housing or shroud 160. A suitable washer 162 and clip 164 may be provided on pin extension 150 in order to prevent the disengagement therefrom of cable end 152. Gearshift actuator arm 82, fixed for only pivotal movement about the axis of pivot pin 108, is provided with a gear segment 166 which is in constant engagement with an idler gear 168 which, in turn, is maintained in engagement with an indicator drive gear 170 (FIGURES 2, 3 and 7). Drive gear 170, provided with an internally formed driving surface 172, is rotatably secured within apertures 174 and 176 of side plates 60 and 62 by means of hub portions 178 and 180. Idler gear 168, however, is mounted for rotation on a tubular drum 182 which has oppositely disposed hub portions loosely received within enlarged slots 184 and 186 formed in side plates 60 and 62, respectively. Slot 184 and 186 permit drum 182 to be moved until idler gear 168 is properly engaged with gear sector 166 and drive gear 170 at which time the coacting nut and screw 188 may be tightened against suitable annular washers 190 and 192 so as to maintain idler gear 168 in position.

An arcuate opening 194 (FIGURES 2 and 8), formed in side plate 60, permits the free extension therethrough of a motion transmitting pin 196 which is secured to an arm 82 and has one end 198 of a transmission cable 200 pivotally secured thereto. A suitable clip 202 and washer 204 may be provided in order to retain cable end 198. A cable shroud or housing 206 is preferably secured to a laterally projecting support 208 which has a slot-like opening 210 provided for the reception and retention therein of said shroud.

FIGURE 10, a view taken generally in the direction of arrow A of FIGURE 5, illustrates electrical switches 212 and 214 suitably secured to side plate 60 and positioned so as to be actuated by pins 216 and 74, respectively.

Referring to FIGURE 3, the radiating lines identified as L, D, I and R indicate the position of centerline 57 when selector lever 56 is moved to transmission operating ranges or conditions of Low Forward, Normal Forward Drive, Idle and Reverse Drive, respectively. The term, Idle, of course, denotes that condition of the transmission 24 wherein it is not capable of transmitting power from its input shaft to its output shaft. This is often referred to as "Neutral" especially with reference to manually operated transmissions or to automatic transmissions employed in combination with conventional piston engines. A detent spring 218, secured to side plate 62 by a suitable screw 220 and provided with arm portions 222 and 224, serves to maintain pivot pin 118 in either extreme position of slot 124. Whenever pivot pin 118 is maintained in the position illustrated in FIGURE 3, pin 74 and bushing 90 are permitted to slide within the arcuate slot 92 which has its centerline 226 determined generally by a radius from the axis of pin 118.

As selector lever 56 is moved from the position illustrated to, for example, Low Forward indicated by line L, lever 56 is rotated counter-clockwise about the axis of pin 118 moving pin 74 and bushing 90 along the arcuate slot 92. Lever 82 provided with only a vertically extending slot 80 through which end 78 of pin 74 is received is thereby rotated counter-clockwise about its center of rotation which is the axis of pivot pin 108. Accordingly, as both selector lever 56 and transmission lever 82 are thusly rotated, gear sector 166 of lever 82 rotates idler gear 168 clockwise and indicator gear counter-clockwise while pin 196 moves cable 200 in order to actuate the transmission gearshift control.

Similarly, rotation of selector lever 56 from the Low Forward position of L to either of the positions indicated by D, I and R causes clockwise rotation of transmission lever 82 with corresponding movement of the associated elements. It should be observed, however, that whenever pin 118 is maintained in its upper position as illustrated in FIGURE 3, rotational movement of selector lever 56 is not accompanied by any movement of sprag control lever 122.

Whenever selector levers 56 is placed in the Idle position downward movement of pin 74 and bushing 90 is made possible by virtue of slot 80 of lever 82, slot 126 of side plate 62 and slot 228 of side plate 60 being in substantial alignment with each other.

Accordingly, in order to rotate sprag lever 122 and place lever 56 in the Park position, selector lever 56 is urged vertically downwardly from the Idle position causing pin 118 to move downwardly from the FIGURE 3 position to the other extreme end of slot 124 where it is once again resiliently retained by arm 224 of spring 218. During such downward movement of selector lever 56 guide pin 74 slides vertically downwardly through vertical slot 80 and depending slot portions 126 and 228.

Downward movement of pin 118 causes lever 122 to rotate clockwise about the axis of pivot pin 134 thereby actuating cable 154 and applying the parking sprag schematically illustrated at 230 of FIGURE 1.

Referring to FIGURE 10, an electrical switching assembly 214 is suitably secured to side plate 60 in a manner placing its switch actuating arms 232 and 234 generally in the path of vertical travel of end 78 of guide pin 74. Electrical terminals 236 and 238 are serially connected with an electrical engine starting circuit comprised of conductors 240, 242 and 244 starting motor 246 and a visual indicator such as a lamp 248. A source of electrical potential 250 provides electrical energy, by means of conductors 252 and 254 and switch 256 to any suitable ignition circuit.

The electrical system described above provides means for preventing cranking of the turbine engine in any position of the selector lever 56 or transmission gearshift control other than Park position wherein the parking sprag 230 is effective for preventing rotation of the power turbine 20. For example, when selector lever 56 is moved downwardly, end 78 of pin 74 abuts against and moves switch arm 234 downwardly closing the circuit through conductors 240 and 242. Switch arm 232 being mechanically connected to arm 234 is positioned by the movement of arm 234 immediately above pin end 78 so that subsequent upward movement of selector lever 56 and pin 74 will cause switch assembly 214 to open the circuit through conductors 240 and 242.

If after switch 214 is closed the wiper-like switch 256 is moved to the position indicated in phantom line so as to close the circuit between conductors 252, 254 and 240, source 250 will cause energization of starting motor 246 and lamp 248. Once the turbine engine has started and become self-sustaining, switch 256 is moved to the right thereby de-energizing the circuit comprised of conductors 240 and 242 while still completing the circuit between conductors 252 and 254 thereby maintaining ignition. Lamp 248, of course, quickly indicates to the vehicle operator whether or not the selector lever 56 is in Park position.

A second electrical switching assembly 212 is also suitably secured to side plate 60 in a manner causing its actuating arms 258 and 260 to be generally oppositely disposed about an actuating pin 216 secured to and carried by an extending arm portion 262 of transmission lever 82.

Whenever selector lever 56 is rotated to Reverse position, indicated by line R, transmission lever 82 and its extending arm portion 262 are rotated to one extreme clockwise position as viewed in FIGURE 3 causing pin 216 to abut against and move switch arm 260 downwardly. Such downward movement of switch arm 260 causes switch arm 258 to become positioned above pin 216 and causes the electrical circuit between conductors 264 and 266 to be closed. A conventional back-up lamp 268, a source of electrical potential 270 and a switch member 272 are serially connected with conductors 264 and 266 and switch assembly 212. Switches 272 and 256 may be operatively connected so as to simultaneously complete the respective electrical circuits.

When selector lever 56 is moved out of the Reverse position pin 216 abuts against and moves switch arm 258 upwardly opening the circuit between conductors 264 and 266.

FIGURE 11 illustrates a drum-type visual indicator assembly 272 adapted to be driven as by means of a flexible drive cable 274 having one end 276 received within and driven by the drive gear 170. Assembly 272 is comprised of a drum portion 278 suitably journalled in a wall portion of the console housing 48. A cup-like cover member 280, covering the drum 278 and secured to housing 48, is provided with a window 282 through which can be seen, one at any particular time, characters (such as, I, for Idle) carried by the drum indicating the position in which selector lever 56 is placed. As selector lever 56 is rotated about pin 118, gear sector 166 correspondingly rotates drum 278 by means of idler gear 168, drive gear 170 and drive cable 274 thereby providing a continual visual indication for the operator.

Sprag 230 has been illustrated as being applied directly to the output or propellor shaft 36 of the multiple speed power transmission 24 when selector lever 56 is in the Park position. It should of course be apparent that the braking function performed by sprag 230 could be performed internally of the transmission 24 and that such internal means responsive to actuation by the actuator means 50 is contemplated by this invention.

Multiple sprag or brakes can be provided as illustrated by the transmission 54a and sprags 230a. For example in automatic power transmissions of the type employing fluid drive couplings between the input and output of the power transmission a sprag 230a would preferably be employed to retard rotation of the power turbine 20, while sprag 230 would be employed to keep the propeller shaft 36 from turning. Actuation of both sprags would occur as discussed with reference to sprag 230.

Although only a preferred embodiment of the invention has been disclosed and described it is apparent that other modifications and embodiments are possible within the scope of the appended claims.

We claim:

1. A gear shift mechanism for an automatic power transmission comprising a support member, a first pivot member slidably retained by said support member, a selector lever journalled on said first pivot member and extending beyond said support member, first lever means continually moved by said selector lever to positions corresponding to the position assumed by said selector lever as said selector lever is rotated about said first pivot, actuating means controlled by said first lever means for shifting said power transmission in accordance with the position of said first lever means, second lever means pivotally supported on said support member and connected to said first pivot member in a manner enabling said first pivot member to at times drivingly rotate said second lever means, second actuating means controlled by said second lever means for at times actuating a braking mechanism, and resilient restraining means connected to said support member for permitting said first pivot member to be translationally positioned into either of two operating positions and for maintaining said first pivot member in either of said operating positions, said selector lever being capable of actuating said first lever means only when said first pivot member is in one of said two operating positions and said selector lever being effective to actuate said second lever means whenever said selector lever and said first pivot member are translationally moved from said one position to the other of said two operating positions.

2. A gear shift mechanism for an automatic power transmission comprising a support member, a pivot member slidably received in said support member, a variably positioned selector lever journalled on and pivotally supported by said pivot member and having one end extending beyond said support member, said pivot member being slidably positionable to either of two operating positions one of which permits rotation of said selector lever thereabout, first lever means continually moved by said selector lever to positions corresponding to the position assumed by said selector lever as said selector lever is rotated about said pivot member, first actuating means controlled by said first lever means for shifting said power transmission in accordance with the position of said selector lever and said first lever means, second lever means operatively connected to said pivot member and adapted to be moved thereby to an actuating position whenever said pivot member is moved to the other of said two operating positions, second actuating means controlled by said second lever means for actuating an associated braking mechanism whenever said second lever means is moved to said actuating position, means for preventing rotation of said selector lever about said pivot member whenever said pivot member is in said other of said operating positions, and resilient detent means connected to said support member for engaging and resiliently maintaining said pivot member in either of said operating positions.

3. In a vehicle having a passenger compartment containing spaced side-by-side seats therein, ground contacting driving wheels, a multiple speed power transmission having an output shaft operatively connected to said wheels, a gas turbine engine having a power turbine with an output shaft operatively connected to an input shaft of said transmission for providing driving power to said wheels, a console formed between said spaced seats and containing a manually operable gear shift control mechanism for said transmission, said mechanism comprising manually operable lever means for selecting any one of a plurality of transmission operating conditions including forward drive, reverse drive, idle and park, and a plurality of separate braking means actuated in response to said lever means being placed in said park condition for respectively retarding rotation of said power turbine and said transmission output shaft.

4. A gear shift mechanism for a multiple speed power transmission, comprising a support assembly having a pair of spaced walls, a selector trunnion slidably positioned along said support assembly, a variably positioned selector lever pivotally supported on said trunnion and having one end extending beyond said spaced walls, a first pivot member retained by one of said spaced walls and having one end projecting inwardly of said walls, a transmission actuating lever having a first bearing aperture formed therein for the pivotal reception of said projecting end of said first pivot member, a first generally vertically directed elongated slot formed in said transmission actuating lever, a first arcuate slot formed in said one wall generally radially about said first pivot member, a second vertically directed slot formed in said one wall depending downwardly from said first arcuate slot towards said first pivot member, a second arcuate slot formed in the other of said spaced walls and in substantial alignment with said first arcuate slot, a third vertically directed slot formed in said other wall depending downwardly from said second arcuate slot and in substantial alignment with said second vertically directed slot, a fourth vertically directed slot formed in said outer wall in alignment with said third vertical slot receiving said trunnion therethrough, resilient means for resiliently maintaining said trunnion in either the upper-most end or the lower-most end of said fourth slot, a motion transmitting pin secured to said selector lever having one end extending through said first vertical slot formed in said transmission lever and said first arcuate slot and having the other end extending through said second arcuate slot, a second pivot member retained at least by one of said spaced walls, a braking lever having a second bearing aperture formed therein for the pivotal reception of said second pivot member, a third bearing aperture formed in said braking lever for the reception therethrough of said trunnion, first means operatively connecting said transmission lever to a gear shift control of said transmission, second means for operatively connecting said braking lever to a suitable associated braking mechanism, a gear sector formed on said transmission lever, a driven gear member, an idler gear intermediate said gear sector and said driven gear and in operative engagement therewith, a selector lever indicator dial, a flexible transmission member operatively connecting said driven gear to said dial, a projecting arm portion formed on said transmission lever, and switching means placed in the path of travel of said arm portion for at times being actuated by said arm portion in order to open and close an associated electrical circuit.

5. A gear shift mechanism for a multiple speed power transmission, comprising a support member, a variably positioned selector lever member, a first generally vertically extending slot formed in one of said members, a selector trunnion slidably received in said vertical slot and pivotally connected to the other of said members, said selector trunnion having two operating positions within said slot, resilient detent means operatively connected to said other of said members for both permitting said selector trunnion to be selectively moved from a selected one of said two operating positions to the other of said two operating positions and for maintaining said selector trunnion in either of said two operating positions selected, a transmission actuating lever pivotally supported on said support member, a drive member carried by said selector lever operatively engaging said transmission actuating lever and extending through an arcuate slot formed in said support member, said arcuate slot being formed so as to be positioned generally circumferentially about said selector trunnion when said selector trunnion is in one of said two operating positions, said selector lever and said drive member being effective whenever said selector trunnion is in said one of said two operating positions to rotate said transmission actuating lever in order to select transmission operating ranges, a braking lever pivotally supported on said support member and operatively connected to said selector lever, motion transmitting means operatively connecting said braking lever to a suitable associated braking mechanism, and a second generally vertically extending slot formed in said support member extending downwardly from said arcuate slot, said selector lever being effective to rotate said brake lever and actuate said associated braking mechanism whenever said selector lever is moved downwardly causing said selector trunnion to assume a second of said two operating positions and simultaneously causing said drive member to slide downwardly within said second vertically extending slot, said second vertically extending slot having side edges for engaging said drive member in order to prevent any actuation of said transmission actuating lever by said selector lever during said downward sliding of said drive member.

References Cited by the Examiner

UNITED STATES PATENTS

| | | | |
|---|---|---|---|
| 2,094,177 | 9/1937 | Lindemuth et al. | 290—38 |
| 2,430,118 | 11/1947 | Forssell | 315—79 |
| 2,745,526 | 5/1956 | Saives | 192—4 |
| 2,926,762 | 3/1960 | Edgley | 192—4 |
| 3,035,563 | 5/1962 | Strauss | 74—472 X |

OTHER REFERENCES

General Motors Engineering Journal, Volume 5, No. 4, October-November-December 1958, "Firebird III: A New Concept in Automotive Engineering," pp. 33–37.

Automobile Engineer, October 1954 "Gas Turbine Car," pp. 405–407.

DAVID J. WILLIAMOWSKY, *Primary Examiner.*

DON A. WAITE, *Examiner.*

J. R. BENEFIEL, *Assistant Examiner.*